United States Patent [19]
Funnell

[11] Patent Number: 5,101,601
[45] Date of Patent: Apr. 7, 1992

[54] GRINDING WORKPIECES

[75] Inventor: James G. Funnell, Upminster, Great Britain

[73] Assignee: Ford Motor Company, Dearborn, Mich.

[21] Appl. No.: 613,589

[22] PCT Filed: Jun. 2, 1989

[86] PCT No.: PCT/GB89/00609
§ 371 Date: Jan. 22, 1991
§ 102(e) Date: Jan. 22, 1991

[87] PCT Pub. No.: WO89/11952
PCT Pub. Date: Dec. 14, 1989

[30] Foreign Application Priority Data
Jun. 4, 1988 [GB] United Kingdom ............... 8813239

[51] Int. Cl.$^5$ .............................................. B24B 49/00
[52] U.S. Cl. ................................ 51/165.77; 51/165.87; 51/33 W; 51/105 EC; 51/281 C

[58] Field of Search ................... 51/165.71, 33 W, 44, 51/48 R, 50 R, 50 PC, 97 WC, 105 EC, 281 C, 165.77, 165.76, 165.89

[56] References Cited
U.S. PATENT DOCUMENTS

| | | | |
|---|---|---|---|
| 3,886,693 | 6/1975 | Tajnaföi et al. | 51/33 W |
| 4,077,302 | 3/1978 | Staebler | 51/33 W |
| 4,238,205 | 12/1980 | Geiger et al. | 51/33 W |
| 4,485,592 | 12/1984 | Kawaguchi et al. | 51/58 |

Primary Examiner—M. Rachuba
Attorney, Agent, or Firm—Joseph W. Malleck; Clifford L. Sadler

[57] ABSTRACT

Where a circumferential surface has to be ground on a workpiece and the workpiece is being rotated around an axis which is not concentric with the surface, both the grinding wheel axis and the workpiece rotation axis are displaced during the course of each workpiece revolution. The result is that the point of contact between the grinding wheel and workpiece surface always lies on a straight line.

9 Claims, 2 Drawing Sheets

GRINDING WORKPIECES

This invention relates to a method of and to an apparatus for grinding a circumferential surface on a workpiece. In particular the invention is applicable to the grinding of a circumferential surface on a workpiece where the workpiece is being rotated about an axis, but the surface to be ground is not concentric with that axis. Examples of such applications are the grinding of cam profiles on camshafts (where the surface being ground is non-circular) and the grinding of crank pin journals on crankshafts (where the surface being ground is circular but is offset from the crankshaft axis).

It is known to grind crankshafts by using a "master blank" as a template and to set up the grinding machine to copy the profile of the blank to the workpiece. This technique suffers from inaccuracy through the need for a number of pivoted linkages and supports between the blank and the workpiece, and also as a result of wear on the blank.

Such machines which effectively copy the shape of an accurately dimensioned blank have now been largely replaced by CNC (computer numerically controlled) grinding machines where the movement cycle of the grinding wheel or of the workpiece is programmed into the machine.

It is also known to grind crankshaft journals (which each have a circular circumference but are located on different axes) by mounting the crankshaft so that it rotates about the axis of the journals being ground. This requires careful setting up, and the crankshaft has to be remounted at least three times for all the journals to be ground.

According to a first aspect of the invention there is provided a method of grinding a circumferential surface on a rotating workpiece where the surface is not concentric with the axis of rotation of the workpiece, the method comprising mounting a grinding wheel on a first axis, mounting the workpiece for rotation about a second axis, rotating the grinding wheel and the workpiece about their respective axes so that the grinding wheel makes grinding contact with the surface to be ground and, during each workpiece revolution, moving the grinding wheel axis backwards and forwards in a first plane and moving the workpiece axis in a second plane which is inclined to the first plane, with the movement of both axes being under computer numerical control.

In theory, the second plane can be at any angle from 1 up to and including 90 degrees to the first plane. It is important that the movement of the axis in the second plane be capable of resolution into components, one of which makes an angle of 90 degrees to the first plane. Practical reasons are however likely to limit the possible angles of inclination, and it is preferred that an angle of about 45 degrees be chosen.

The workpiece axis preferably performs simple harmonic motion in the second plane.

The reason for moving the workpiece axis in addition to the grinding wheel axis is to ensure that the point of contact between the grinding wheel and the surface being ground always lies on the same line, this line preferably lying in the first plane. For circular parts, this results in the surface velocity at the grinding wheel/workpiece interface remaining constant at all times. For noncircular surfaces, a good approximation to constant surface velocity is achieved. The grinding conditions are thus optimised and all parts of the circumference are treated evenly.

The invention also provides computer numerically controlled apparatus for grinding a circumferential surface on a workpiece, the apparatus comprising a grinding wheel mounted for rotation on a first axis and a rotatable workpiece support defining a second axis about which a workpiece can be supported and rotated, characterised in that the first axis is reciprocable along a first path, and the workpiece support with the second axis is reciprocable along a second path at an angle to the first path.

The angle which the second path makes to the first linear path is preferably of the order of 45 degrees, but may vary between 90 degrees and about 20 degrees. It is not essential for the second path to be linear, but it is likely that this will be the case. The second axis may have a drive mechanism which moves it backwards and forwards in the second path with simple harmonic motion.

The apparatus may include means for varying the rotational speed of the grinding wheel and/or of the workpiece during each workpiece revolution.

The displacement mechanisms which move either the first axis along the first path or the second axis along the second path are preferably controllable to give a variable displacement speed.

The invention will now be further described, by way of example, with reference to the accompanying drawings, in which.

Figure 1:
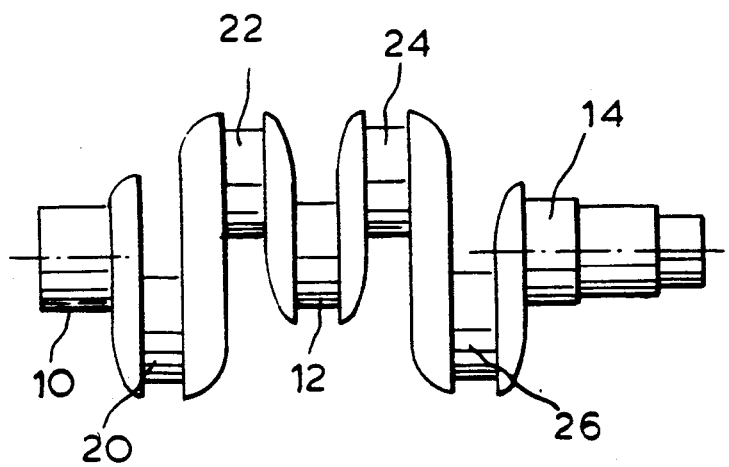
FIG. 1 is a perspective view of a motor vehicle engine crankshaft which is one example of a component which can be ground in accordance with the invention.

The crankshaft shown in FIG. 1 is conventional and has three crank journals 10, 12 and 14 which define the axis of rotation of the shaft when it is in use in an engine. Between the crank journals are crank pin journals 20, 22, 24, 26. The journals 20 and 26 have a common axis and the journals 22 and 24 have a common axis. Conventionally crankshafts have been ground by mounting the shaft first on the axis of the journals 10, 12 and 14 to grind those journals and then remounting the shaft so that it rotates about the axis of the journals 20 and 24 so that those journals can be ground, and then again remounting the shaft for rotation about the axes of the journals 22 and 26 so that these journals can be ground. All this is time consuming.

Figure 2:
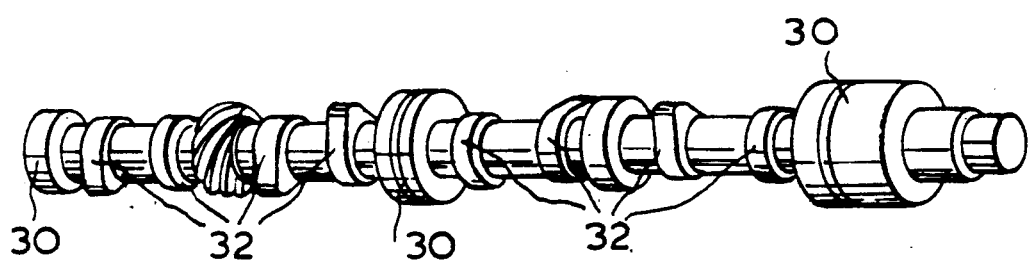
FIG. 2 is a perspective view of an engine camshaft which is a second example of a component which can be ground by the method of the invention.

FIG. 2 shows a camshaft with bearing journals 30 and cam profiles 32. The journals 30 are all centred on the axis of the shaft, but the cam profiles 32 are non-circular.

In order to grind the surfaces of either of these shafts shown in FIGS. 1 or 2, it is only necessary, in accordance with the invention, to mount the shaft for rotation about its primary axis. All the surfaces to be ground can then be dealt with while the shaft is rotating about this primary axis.

Figure 3:
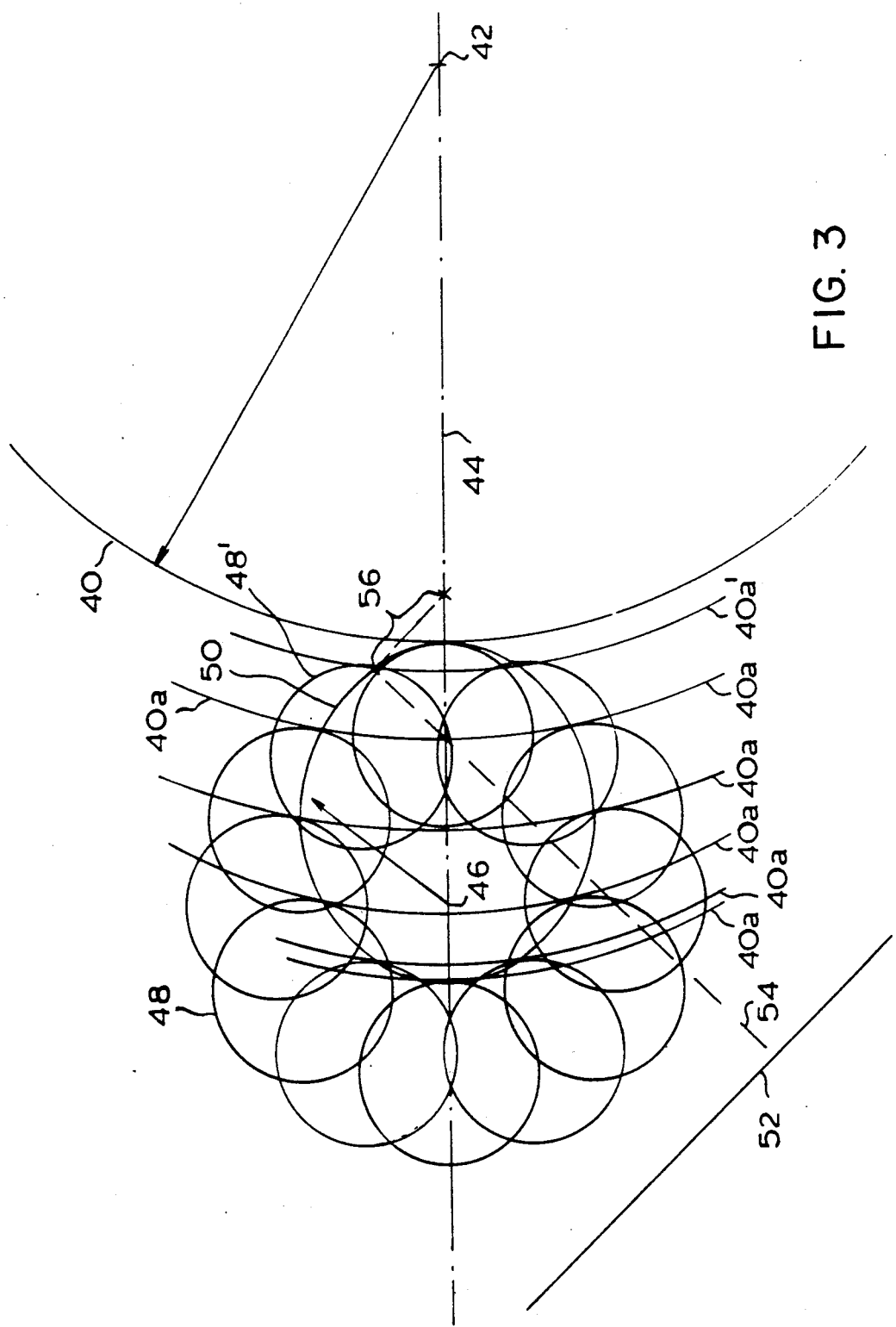
FIG. 3 is a geometrical diagram illustrating the invention.

FIG. 3 shows how this is done in the case of a crank pin journal of a crankshaft.

FIG. 3 shows a grinding wheel 40 with its axis of rotation at 42. The grinding wheel is mounted for reciprocal linear movement along a line 44. To accomplish this the grinding wheel can be mounted in suitable journals movable on a track, and this is in itself known to the man skilled in the art.

In FIG. 3 we are concerned with grinding a crankshaft, and we start with the main crankshaft axis mounted at 46 for rotation on the line 44. When the crankshaft is rotated about this axis, the crank pin journals will move through the various positions shown by intersecting circles 48 around the point 46. If the crankshaft axis 46 is fixed in the position shown in FIG. 3 and the grinding wheel moves backwards and forwards along the line 44, then it can be shown geometrically that the locus of contact between the grinding wheel surface and the pin journal will be on the heavy line 50 which is constructed in FIG. 3. Also shown in FIG. 3 in phantom lines are the momentary positions 40a of the grinding wheel surface as it moves forwards and back.

It is undesirable for the locus of contact 50 to be of this form because it leads to non uniform grinding contact between the wheel and the journal. In order to overcome this difficulty and to produce a locus of contact which lies on a single straight line, the mounting of the crankshaft axis 46 is also movable and is moved up and down relative to the line 44 so that the point of contact between the grinding wheel and the journal at any moment in time is brought back to the line 44.

This is done by mounting the crankshaft axis 46 on a support which moves on a linear slide 52. In FIG. 3 the slide 52 is shown lying at 45 degrees to the line 44, and this appears likely to be a practical embodiment. However the track 52 could like at other angles to the line 44 provided the track extends in a direction which has a component at right angles to the line 44. A dotted line 54 drawn from the slide track 52 to the point of contact between the grinding wheel at 40a' and the pin journal position 48' shows the height above the line 44 at which this point of contact lies. To bring this point of contact back to the line 44 requires movement along the second dotted line 56, and this is accomplished by a movement down the track 52 by a distance equal to the length of the line 56. This movement along the track 52 will be continuous as the pin journal moves around the axis 46, and the axis 46 will therefore continuously move up and down along the track 52 in order that the locus of contact 50 becomes a straight line rather than the generally oval form shown in bold lines in FIG. 3. The amplitude of the continuous movement along the track appears likely to have a sinusoidal characteristic, i.e. the movement will be in effect simple harmonic motion, and the motion of the grinding wheel axis 42 between the positions 40a can also be expected to have a sinusoidal character.

In this way, the point of contact between the grinding wheel and the journal always lies on the straight line joining their centres. This results in even grinding conditions around the whole circumference.

When grinding a camshaft as shown in FIG. 2, similar conditions are maintained with the axis of rotation of the camshaft being moved up and down to maintain the point of grinding contact always on a straight line between the centre of the grinding wheel and the centre of the camshaft.

Although the invention has been described with reference to the grinding of external surfaces, it can be equally applied to the grinding of an internal circumferential surface.

I claim:

1. A method of grinding a circumferential surface on a rotating workpiece where the surface is not concentric with the axis of rotation of the workpiece, the method comprising mounting a grinding wheel on a first axis, mounting the workpiece for rotation about a second axis, and rotating the grinding wheel and the workpiece about their respective axes so that the grinding wheel makes grinding contact with the surface to be ground, characterised in that during each workpiece revolution the grinding wheel axis is moved backwards and forwards in a first plane and the workpiece axis is moved in a second plane which is inclined to the first plane, with the movement of both axes with harmonic motion being under computer numerical control.

2. A method as claimed in claim 1, wherein the first axis and the second axis are parallel.

3. A method as in claim 1, wherein the angle between the first and second planes is approximately 45 degrees.

4. A method as in claim 1, wherein the point of contact between the grinding wheel and the surface being ground always lies in the first plane.

5. Computer numerically controlled apparatus for grinding a circumferential surface on a workpiece, the apparatus comprising a grinding wheel mounted for rotation on a first axis and a rotatable workpiece support defining a second axis about which a workpiece can be supported and rotated, wherein the first axis is reciprocable along a first straight path, and the workpiece support with the second axis is reciprocable with harmonic motion along a second straight path at an angle to the first path.

6. Apparatus as claimed in claim 5, wherein the angle which the second path makes to the first path is between 90 degrees and about 20 degrees.

7. Apparatus as claimed in claim 5, wherein the angle which the second path makes to the first path is about 45 degrees.

8. Apparatus as claimed in claim 5, including means for varying the rotational speed of the workpiece during each workpiece revolution.

9. Apparatus as claimed in claim 5, wherein displacement mechanisms are provided to move the first axis along the first path and the second axis along the second path and these mechanisms are controllable to give variable displacement speeds.

* * * * *